(12) United States Patent
Clark et al.

(10) Patent No.: US 7,465,476 B2
(45) Date of Patent: Dec. 16, 2008

(54) METHOD OF RECYCLING INERT GAS

(75) Inventors: Daniel Clark, Derby (GB); Jeffrey Allen, Derby (GB); Justin M Burrows, Derby (GB)

(73) Assignee: Rolls-Royce plc, London (GB)

( * ) Notice: Subject to any disclaimer, the term of this patent is extended or adjusted under 35 U.S.C. 154(b) by 266 days.

(21) Appl. No.: 11/176,305

(22) Filed: Jul. 8, 2005

(65) Prior Publication Data

US 2006/0032441 A1     Feb. 16, 2006

(30) Foreign Application Priority Data

Aug. 12, 2004   (GB) ................... 0417936.2

(51) Int. Cl.
    *B05D 1/40*      (2006.01)
(52) U.S. Cl. .............. 427/345; 427/398.5; 427/248.1
(58) Field of Classification Search ............ 427/345, 427/398.5, 248.1
See application file for complete search history.

(56) References Cited

U.S. PATENT DOCUMENTS

| | | | | |
|---|---|---|---|---|
| 3,610,876 A | * | 10/1971 | Bhat | ............ 219/137 R |
| 4,616,694 A | * | 10/1986 | Hsieh | ............ 165/47 |
| 5,227,038 A | | 7/1993 | Smalley | |
| 5,250,780 A | | 10/1993 | Hansz | |
| 5,590,387 A | * | 12/1996 | Schmidt et al. | ............ 419/36 |
| 5,897,682 A | | 4/1999 | Koaizawa | |
| 5,958,348 A | * | 9/1999 | Bi et al. | ............ 422/186.04 |
| 6,113,754 A | | 9/2000 | Oh | |
| 6,364,932 B1 | * | 4/2002 | Ji et al. | ............ 95/12 |
| 6,759,085 B2 | * | 7/2004 | Muehlberger | ............ 427/189 |
| 2004/0126499 A1 | * | 7/2004 | Heinrich et al. | ............ 427/421 |
| 2004/0222383 A1 | * | 11/2004 | Kawakami | ............ 250/430 |

FOREIGN PATENT DOCUMENTS

| | | |
|---|---|---|
| EP | 0 757 918 A | 2/1997 |
| JP | 6 224 144 AB | 8/1994 |

* cited by examiner

*Primary Examiner*—Bret Chen
(74) *Attorney, Agent, or Firm*—Manelli Denison & Selter PLLC

(57) ABSTRACT

A method for recycling an inert gas evacuated from a material deposition process chamber 10 comprises cooling the evacuated inert gas and recirculating a proportion of the cooled gas to the chamber 10 at a first temperature for use as a cooling gas in the material deposition process 12, and recirculating a proportion of the cooled gas to the chamber 10 at a second temperature for use as a shielding gas in the material deposition process 12, the second temperature being higher than the first temperature. Apparatus 22 for recycling an inert gas is also disclosed.

12 Claims, 2 Drawing Sheets

METHOD OF RECYCLING INERT GAS

FIELD OF THE INVENTION

The present invention relates to a method and apparatus for recycling an inert gas evacuated from a material deposition process chamber.

BACKGROUND OF THE INVENTION

Material deposition processes, such as Shaped Metal Deposition (SMD) and Direct Laser Deposition (DLD), are carried out in an inert gas atmosphere to prevent oxidation of the deposited material. Such processes are normally carried out in a chamber, for example with a small internal over pressure, to which the inert gas is supplied.

Conventionally, the inert gas is supplied to the chamber and discarded after use such that a constant supply of the gas is needed. This is inefficient, especially when inert gases having a large specific heat capacity, such as helium, are used as these tend to be expensive.

It would therefore be desirable to reduce the disadvantages of the known process.

SUMMARY OF THE INVENTION

According to one aspect of the present invention, there is provided a method for recycling an inert gas evacuated from a material deposition process chamber, the method comprising:
  after evacuation cooling the evacuated inert gas to provide a cooled gas;
  recirculating a proportion of the cooled gas to the chamber at a first temperature for use as a cooling gas in the material deposition process; and
  recirculating a proportion of the cooled gas to the chamber at a second temperature for use as a shielding gas in the material deposition process, the second temperature being higher than the first temperature.

According to another aspect of the present invention, there is provided apparatus for recycling an inert gas evacuated from a material deposition process chamber, the apparatus comprising means for cooling the evacuated inert gas to provide a cooled gas, means for recirculating a proportion of the cooled gas to the chamber at a first temperature for use as a cooling gas in the material deposition process, and means for recirculating a proportion of the cooled gas to the chamber at a second temperature for use as a shielding gas in the material deposition process, the second temperature being higher than the first temperature.

Preferred features of the invention are defined in the accompanying claims.

DESCRIPTION OF THE DRAWINGS

An embodiment of the invention will now be described by way of example only and with reference to the accompanying drawings, in which:—

DETAILED DESCRIPTION OF THE INVENTION

Figure 1:
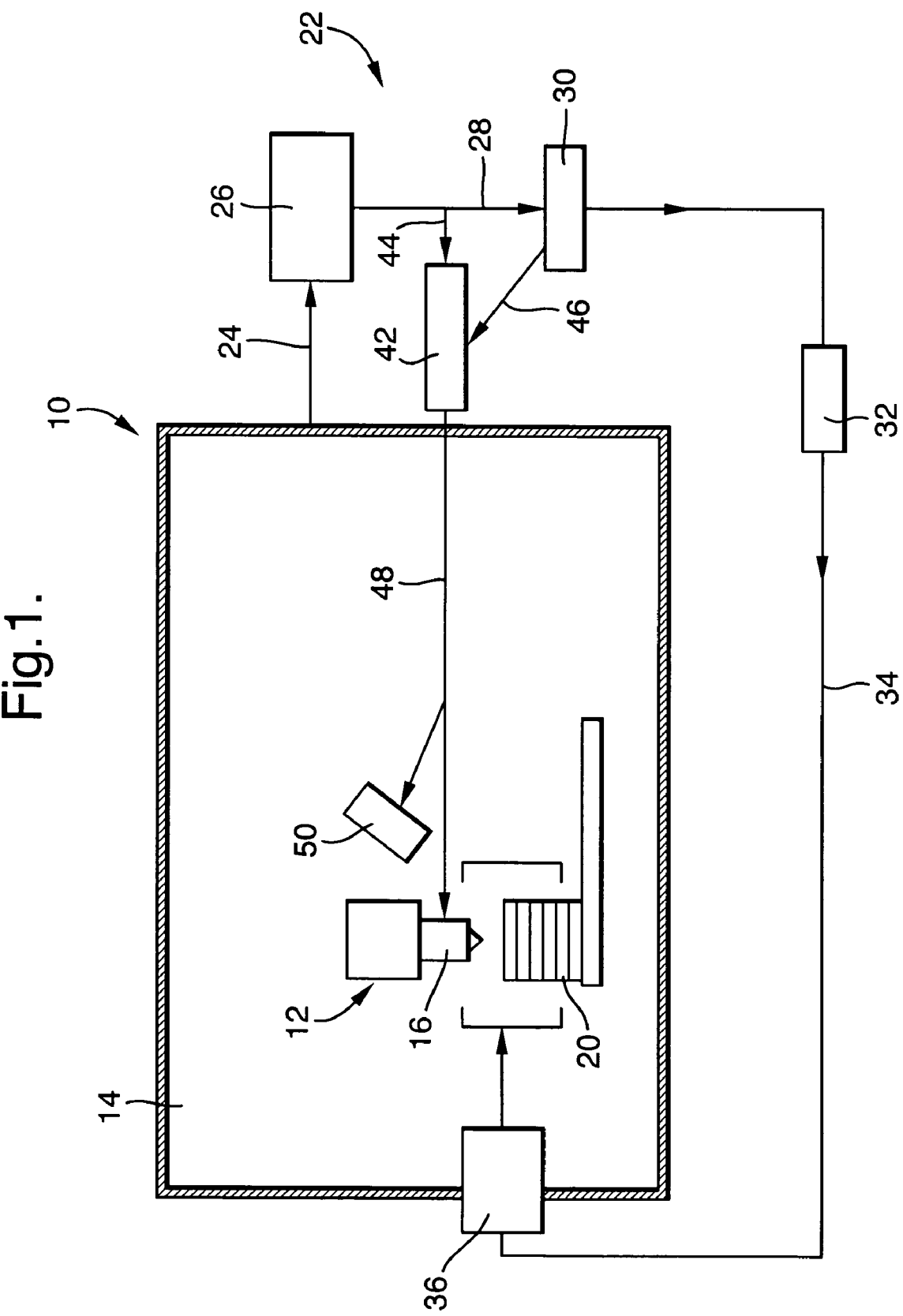
FIG. 1 is a schematic view of a method and apparatus for recycling inert gas according to the invention.

FIG. 1 illustrates diagrammatically a material deposition process chamber 10 in which a material deposition process generally designated with the reference numeral 12 is carried out. The chamber 10 is in the form of a gas chamber to which an inert gas is supplied. The chamber 10 is sealed to a high standard and gas is supplied to the chamber 10 such that there is a small internal over pressure. The chamber 10 contains a minimal amount of oxygen and thus provides an inert gas atmosphere 14 in which the material deposition process 12 can be carried out.

Figure 2:
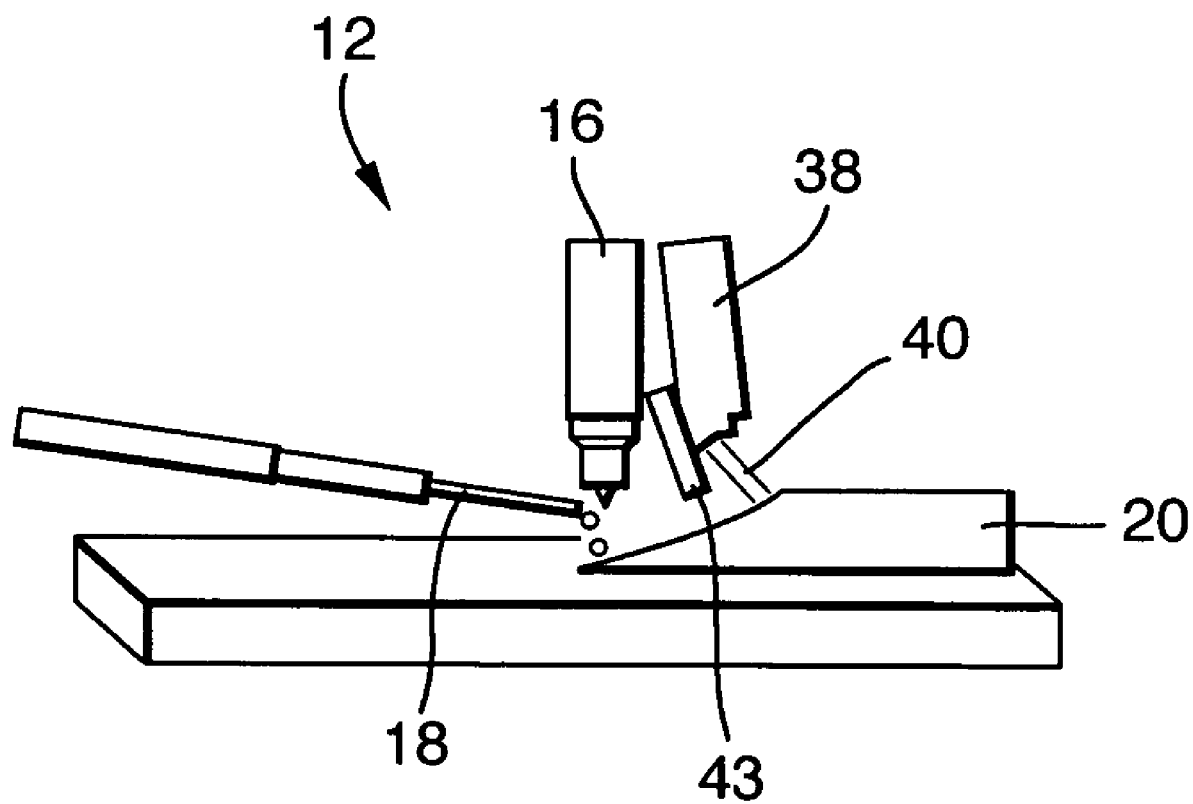
FIG. 2 is a detailed view of the method and apparatus in use with a material deposition process.

Referring to FIG. 2, one example of a material deposition process 12 carried out in the chamber 10 is shown. The material deposition process 12 is a conventional Shaped Metal Deposition (SMD) process in which a heat source, for example a tungsten inert gas (TIG) torch 16, is used to create an arc and melt a filler wire 18. When melted, the filler wire 18 is deposited onto an underlying layer of material and solidifies to form deposited material 20. It will of course be appreciated that the material deposition process 12 can be carried out using any suitable heat source, other than a TIG torch 16, which requires an inert atmosphere. Techniques such as laser and powder or wire deposition, low pressure electron beam, etc, may alternatively be employed.

In order to optimise the properties of the deposited material 20, it is necessary to control the temperature and cooling rate at which the deposition process 12 is carried out. One method by which temperature and cooling rate can be controlled is to use an inert gas. The present invention provides apparatus 22 for recycling the inert gas used in the material deposition process 12 which enables the gas temperature to be carefully controlled, as will now be described.

Referring again to FIG. 1, the apparatus 22 comprises a closed loop system for pumping inert gas from the chamber 10 and recirculating it to the chamber 10. The apparatus 22 preferably operates to continuously pump inert gas and recirculate it to the chamber 10. The apparatus 22 comprises a first path 24 along which gas is evacuated from the chamber 10 and supplied to a gas scrubber 26. The gas scrubber 26 is operable to purify the gas evacuated from the chamber 10 by removing oxygen and moisture, and may remove other gases such as nitrogen and hydrogen. Any suitable gas scrubber 26 may be used, for example comprising a combination of heaters and catalysts to cause the evacuated gas to react and therefore to purify the gas.

A dehumidifier (not shown) may also be provided to remove moisture from the evacuated inert gas.

Upon exit from the gas scrubber 26, a proportion of the purified gas, which may for example be at a temperature in the order of 20° C., is supplied along a second path 28 to a means for cooling the evacuated gas in the form of a gas cooler or chiller 30. The gas cooler 30 is operable to cool the evacuated inert gas to a first temperature which may for example be in the order of −160° C. Means in the form of a pump 32 is provided for recirculating a proportion of the gas cooled to the first temperature to the chamber 10. The gas is recirculated along a thermally insulated gas pipe 34 and is supplied into the chamber 14 using a valve 36 which has a suitably low coefficient of thermal expansion.

The cooled gas recirculated at the first temperature is used as a cooling gas in the material deposition process12 and in particular enables the cooling rate of the deposited material 20 to be carefully controlled. Referring to FIG. 2, according to one embodiment of the invention, the apparatus 22 includes a gas lens 38, which may for example be a ceramic gas lens, for directing a jet 40 of the gas cooled to the first temperature directly towards the deposited material 20 to cool the deposited material20. Shielding means in the form of a shield or baffle 43 is mounted on the end of the gas lens 38 and is positioned between the end of the TIG torch 16 and the gas jet 40 to protect the arc formed by the TIG torch 16 from turbulence formed by the jet 43 in the immediate vicinity of the arc and also from the very low first temperature to which the gas is cooled. Exposure of the arc to such a low temperature may prevent proper melting of the filler wire 18 and thus hinder material deposition.

The flow rate of the gas forming the gas jet 40 is variable to enable the cooling rate of the deposited material 20 to be carefully controlled. Although only one gas jet 40 is illustrated, it is to be understood that any number of gas jets 40 may be provided according to the particular application. In this case, the flow rate of each gas jet 40 may be varied independently to control the cooling rate of the deposited material 20.

When a plurality of gas jets 40 is provided, the temperature of the gas supplied by each jet 40 may be independently variable either as an alternative, or in addition, to the flow rate of the gas. This further contributes to the ability to control the cooling rate of the deposited material 20.

Referring again to FIG. 1, the apparatus 22 includes a gas mixing device in the form of a gas mixer 42. A proportion of the uncooled gas from the gas scrubber 26 is fed along a third path 44 to the gas mixer 42. Likewise, a proportion of the gas which has been cooled to the first temperature in the gas cooler 30 is fed along a fourth path 46 from the gas cooler 30 into the gas mixer 42. The uncooled gas from the scrubber 26 and the gas cooled to the first temperature are mixed in the gas mixer 42 to thereby raise the temperature of the cooled gas from the first temperature to a second temperature, which is higher than the first temperature. For example, the second temperature may be in the order of 15-20° C.

Upon exit from the gas mixer 42, the gas at the second temperature is recirculated into the chamber 10 along a fifth path 48. Most of the gas at the second temperature is supplied to the TIG torch 16 where it acts as a shielding gas in the material deposition process 12. A small proportion of the gas may also be directed towards equipment, such as a camera 50, located in the chamber 10 to cool the equipment and prevent damage thereto.

In an exemplary embodiment, the cooling gas cooled to the first temperature may be recirculated to the chamber 10 along the pipe 34 at a volume flow rate in the order of, for example, between 1000 and 2000 litres per minute, whilst the shielding gas at the second temperature may be recirculated to the chamber 10 along the fifth path 48 at a volume flow rate in the order of, for example, between 15 and 100 litres per minute. It will however be appreciated any suitable flow rates may be selected and will be dependent upon the nature of the process, the required amount of cooling of the evacuated gas, and the desired cooling rate of the deposited material 20.

As mentioned, gas is supplied to the chamber 10 such that there is a small internal over pressure, and this ensures that any leaks which may occur between the chamber 10 and the outside atmosphere are from the chamber 10 and not into the chamber 10. The constant flow of gas around the closed loop system, and in particular the evacuation of the gas from the chamber 10 along the first path 24 via a constriction, ensures that a back pressure is established inside the chamber thereby maintaining the chamber 10 at a positive pressure. In the illustrated embodiment, the gas is evacuated from the chamber 10 through a constriction formed directly in a side wall of the chamber 10. In another embodiment, a side wall of the chamber 10 may include a plurality of perforations over its entire area to thereby act as a reverse diffuser. This would ensure an even flow of gas substantially across the whole cross-section of the chamber 10. It would still be necessary to provide a constriction before evacuating the gas along the first path 24 to establish back pressure and thereby maintain the chamber 10 at a positive pressure.

In order to enable optimisation of the cooling of the deposited material 20 and the deposition process shielding gas, the apparatus 22 includes a temperature monitoring system (not shown). The temperature monitoring system includes temperature sensors which are operable to monitor at least the first and second temperatures, and alternatively or in addition the temperature of the deposited material 20 and the arc temperature of the material deposition process 12. The temperature monitoring system includes a controller which is operable to adjust the amount of cooling of the evacuated gas, for example by varying the flow rate of evacuated gas through the gas cooler 30, to thereby vary the first and/or second temperatures. Additional means may also be provided to vary the gas temperature.

The apparatus 20 may also include a pressure monitoring system to enable the pressure within the chamber 10 to be carefully monitored and controlled.

There is thus provided a method and apparatus 22 for recycling an inert gas evacuated from a material deposition chamber 10. The method and apparatus ensures that the inert gas used in the chamber 10 is continuously recycled and reused rather than being discarded after use. Use of the apparatus 22 is therefore particularly advantageous when the inert gas is an expensive gas, such as helium. This is because at the large volume flow rates required, it is uneconomic to use helium and discard the gas after use. The method and apparatus 22 may however be used to recycle any inert gas or any mixture of inert gases, for example a mixture of argon and helium.

Although embodiments of the invention have been described in the preceding paragraphs with reference to various examples, it should be appreciated that various modifications to the examples given may be made without departing from the scope of the present invention, as claimed. For example, the apparatus may comprise at least two gas coolers 30, one for cooling a proportion of the evacuated gas to the first temperature and the other for cooling a proportion of the evacuated gas to the second temperature. Under these circumstances, the use of a gas mixer 42 may be unnecessary.

We claim:

1. A method for recycling an inert gas evacuated from a material deposition process chamber, the method comprising:
   after evacuation cooling the evacuated inert gas to provide a cooled gas;
   recirculating a proportion of the cooled gas to the chamber at a first temperature for use as a cooling gas in the material deposition process; and
   recirculating a proportion of the cooled gas to the chamber at a second temperature for use as a shielding gas in the material deposition process, the second temperature being higher than the first temperature.

2. A method according to claim 1, wherein the step of cooling the evacuated gas comprises cooling the evacuated gas to the first temperature using a gas cooler.

3. A method according to claim 2, wherein the method comprises recirculating a proportion of the cooled gas to the chamber at the first temperature directly from the gas cooler.

4. A method according to claim 1, wherein the step of recirculating the cooled gas at the first temperature comprises directing the cooled gas towards material deposited during the material deposition process to cool the deposited material.

5. A method according to claim 4, wherein the step of directing the cooled gas comprises directing one or more jets of the cooled gas towards the deposited material.

6. A method according to claim 5, wherein the step of directing the cooled gas comprises independently varying the flow rate of at least one jet of cooled gas to control cooling of the deposited material.

7. A method according to claim 4, wherein when a plurality of jets of the cooled gas are directed towards the deposited material, the step of directing the cooled gas comprises independently varying the temperature of each gas jet to control cooling of the deposited material.

8. A method according to claim 1, wherein the step of recirculating the cooled gas at the second temperature comprises mixing a proportion of the gas cooled to the first temperature with a proportion of the uncooled evacuated gas to raise the temperature of the mixed gas to the second temperature, prior to recirculation to the chamber.

9. A method according to claim 1, wherein the step of recirculating the cooled gas at the second temperature comprises directing the cooled gas towards a heat source used to perform the material deposition process to act as the process shielding gas.

10. A method according to claim 1, wherein the method comprises removing impurities from the evacuated inert gas prior to cooling the evacuated gas.

11. A method according to claim 1, wherein the method comprises recirculating the cooled gas at the first temperature at a higher volume flow rate than the cooled gas at the second temperature.

12. A method according to claim 1, wherein the method comprises continuously cooling the evacuated gas and recirculating the cooled gas to the chamber to provide continuous recycling of the inert gas.

* * * * *